United States Patent
Fenker (10) Patent No.: US 10,566,771 B2
(45) Date of Patent: Feb. 18, 2020

(54) METHOD FOR MOUNTING ELECTRIC SWITCHING SYSTEMS AND ASSEMBLY SUPPORT DEVICE FOR SIMPLIFYING THE ASSEMBLY OF SUCH SWITCHING SYSTEMS

(71) Applicant: Liebherr-Components Biberach GmbH, Biberach an der Riss (DE)

(72) Inventor: Oliver Fenker, Warthausen (DE)

(73) Assignee: Leibherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 15/845,744

(22) Filed: Dec. 18, 2017

(65) Prior Publication Data
US 2018/0109083 A1   Apr. 19, 2018

Related U.S. Application Data

(63) Continuation-in-part of application No. PCT/EP2016/000998, filed on Jun. 15, 2016.

(30) Foreign Application Priority Data

Jun. 16, 2015 (DE) ........................ 10 2015 007 624

(51) Int. Cl.
*H02B 3/00* (2006.01)
*H05K 7/14* (2006.01)
(Continued)

(52) U.S. Cl.
CPC ........... *H02B 3/00* (2013.01); *G06F 17/5068* (2013.01); *G06T 11/60* (2013.01); *H02B 1/04* (2013.01);
(Continued)

(58) Field of Classification Search
CPC ... H02B 3/00; H02B 1/04; H02B 1/32; G05B 19/41805; G05B 15/02; G06F 17/5068;
(Continued)

(56) References Cited

U.S. PATENT DOCUMENTS

| 6,014,083 A | 1/2000 | Bauerschmidt et al. |
| 2010/0033404 A1 | 2/2010 | Hamadou et al. |

(Continued)

FOREIGN PATENT DOCUMENTS

| AT | 513130 B1 | 2/2014 |
| CN | 1209911 A | 3/1999 |

(Continued)

OTHER PUBLICATIONS

Caudell, T. et al., "Augmented Reality: An Application of Heads-Up Display Technology to Manual Manufacturing Processes," Proceeding of the Twenty-Fifth Hawaii International Conference on System Sciences, Jan. 7, 1992, Kauai, Hawaii, USA, 11 pages.
(Continued)

*Primary Examiner* — Sejoon Ahn
(74) *Attorney, Agent, or Firm* — McCoy Russell LLP (57) ABSTRACT

A method for assembling electric switching systems includes wiring and/or connecting electric components together at specific connection points may be used in conjunction with an assembly support device for simplifying and/or checking the assembly of such electric switching systems. A respective component which is provided for connecting in the switching system is identified by an identifying device. At least one target connection point where the identified component is to be connected is determined by a connection point determining device on the basis of the component identified by the identifying device, and the actual connection point where the component has actually been connected is monitored by a monitoring device. If (Continued)

the detected actual connection point deviates from the target connection point, an error message is output.

24 Claims, 3 Drawing Sheets

(51) Int. Cl.
*G06F 17/50* (2006.01)
*G06T 11/60* (2006.01)
*H02B 1/04* (2006.01)
*H02B 1/32* (2006.01)
*G05B 15/02* (2006.01)

(52) U.S. Cl.
CPC ........... *H05K 7/1498* (2013.01); *G05B 15/02* (2013.01); *G06F 2217/02* (2013.01); *H02B 1/32* (2013.01); *Y02P 90/04* (2015.11); *Y02P 90/10* (2015.11); *Y02P 90/16* (2015.11); *Y02P 90/185* (2015.11)

(58) Field of Classification Search
CPC ... G06F 2217/02; G06T 11/60; H05K 7/1498; Y02P 90/04; Y02P 90/10; Y02P 90/16; Y02P 90/185
See application file for complete search history.

(56) References Cited

U.S. PATENT DOCUMENTS

| | | | | |
|---|---|---|---|---|
| 2011/0080487 A1* | 4/2011 | Venkataraman | ..... | H04N 5/2253 348/218.1 |
| 2011/0157221 A1* | 6/2011 | Ptucha | ............... | H04N 1/00198 345/629 |
| 2011/0175750 A1* | 7/2011 | Anderson | .............. | G01D 4/004 340/870.16 |
| 2011/0292075 A1* | 12/2011 | Sukenori | ................. | G06T 11/60 345/629 |
| 2012/0249588 A1 | 10/2012 | Tison et al. | | |
| 2013/0093388 A1 | 4/2013 | Partovi | | |
| 2014/0111346 A1 | 4/2014 | Pinn et al. | | |

FOREIGN PATENT DOCUMENTS

| | | |
|---|---|---|
| CN | 202159302 U | 3/2012 |
| CN | 202758141 U | 2/2013 |
| CN | 102998524 A | 3/2013 |
| DE | 19810115 A1 | 9/1999 |
| DE | 102005046762 A1 | 4/2007 |
| DE | 102008012122 A1 | 9/2009 |
| DE | 202012003317 U1 | 8/2012 |
| DE | 202012003332 U1 | 8/2012 |
| DE | 102011107839 A1 | 1/2013 |
| EP | 0786652 A1 | 7/1997 |
| EP | 1770607 A1 | 4/2007 |
| WO | 2013126892 A1 | 8/2013 |
| WO | 2014028959 A1 | 2/2014 |
| WO | 2015028978 A1 | 3/2015 |

OTHER PUBLICATIONS

ISA European Patent Office, International Search Report Issued in Application No. PCT/EP2016/000998, dated Sep. 1, 2016, WIPO, 4 pages.

State Intellectual Property Office of the People's Republic of China, Office Action and Search Report Issued in Application No. 201680035234.7, dated Feb. 13, 2019, 13 pages. (Submitted with Partial Translation).

* cited by examiner

METHOD FOR MOUNTING ELECTRIC SWITCHING SYSTEMS AND ASSEMBLY SUPPORT DEVICE FOR SIMPLIFYING THE ASSEMBLY OF SUCH SWITCHING SYSTEMS

CROSS-REFERENCE TO RELATED APPLICATIONS

The present application is a Continuation-in-Part Application of International Patent Application Serial No. PCT/EP2016/000998, entitled "METHOD FOR MOUNTING ELECTRIC SWITCHING SYSTEMS, AND ASSEMBLY SUPPORT DEVICE FOR SIMPLIFYING THE ASSEMBLY OF SUCH SWITCHING SYSTEMS," filed on Jun. 15, 2016. International Patent Application Serial No. PCT/EP2016/000998 claims priority to German Patent Application No. 10 2015 007 624.8, filed on Jun. 16, 2015. The entire contents of each of the abovementioned applications are hereby incorporated by reference in their entirety for all purposes.

TECHNICAL FIELD

The present disclosure relates to a method of assembling electric switching systems in which electrical components are wired and/or connected to one another at predefined connector points. The present disclosure further relates to an auxiliary assembly apparatus to facilitate and/or check the assembly of such electric switching systems.

BACKGROUND AND SUMMARY

Such switching systems can, for example, be the switch cabinets of construction machinery or material transfer machinery such as cranes or earthmovers or other work machines and can include various power electronic components such as frequency converters, control electronics, capacitors and various cables having different diameters, different conductor types and different connectors and the like. The assembly of such electric switching systems is highly complex as a rule, requires high concentration of the workman, and is also prone to error while consulting circuit diagrams. On the one hand, not only the components have to be correctly arranged in the switch cabinet, but the correct connector points of the correct components also have to be connected to the respective correct cables or wires, with a large number of cables gradually being arranged in the switch cabinet here. In this respect, components can comprise a plurality of connector points at which a corresponding component is to be wired to various other components, with the respective correct connector point having to be connected to the correct component. Cables of the correct thickness and of the correct cable type are also to be used here depending on the component and on the connection. A standardized carrying out of the work steps that follows a scheme is difficult and is also not easy to monitor due to the variety of and differences between the components to be installed and to be connected to one another.

Such switching systems have previously been wired with the aid of a circuit diagram or also while making use of leads on which the start connector and the target connector are printed. In both cases, the workman has to look for both connectors and must lay the leads accordingly. If work is performed using a circuit diagram, it is also necessary to mark which of the leads has already been laid.

All this work has previously typically been carried out by hand and frequently results in errors that have to be corrected in an expensive and/or complex manner in an additional test step. Due to the manual wiring that has a certain error rate and due to the check that does not reliably find all the errors, it frequently occurs that errors only become noticeable during the deployment in accordance with the intended purpose by the purchaser of the unit.

Unlike with, for example, networks in which current data of the network such as MAC addresses, current connections, etc. can be displayed, a switch cabinet can as a rule not be tested as to its function in the semifinished state since the switch cabinet is not yet live and a step-for-step check is not possible since the interaction of all the components or of specific components that may, however, not even be installed, is necessary for specific functions. An automated monitoring of the assembly of a switch cabinet is in this respect additionally also made more difficult in that the different components are as a rule not always assembled in a previously fixed order, but rather in that completely configured leads are provided to the workman during the switch cabinet construction in respective lengths and with respective fitting means in a chaotic order and the workman then installs this respective lead. Unlike with network installations using patch cables that are always the same and always have the same jacks, the cables to be installed on the construction of a switch cabinet additionally differ from one another with respect to cable diameter, cable type, or fitting means.

The production of such switch cabinets is ultimately very dependent on the respective workman and his form on the day. It would therefore be helpful to simplify the assembly for the workman and to provide the workman with an aid that reduces the number of errors and avoids a complex and/or expensive reworking.

A computer system is also known from document DE 198 10 115 C2 that records images by means of a digital camera of a switch cabinet in which the connector terminals of electrical devices can be recognized. After marking the connector terminals by means of a mouse click and specification of waypoints of the desired cable extent between the connector terminals, likewise by means of one or more mouse clicks, the computer calculates the required cable length and controls a cable assembly machine that then cuts a wiring cable of the required length and provides it with wire ferrules. This admittedly facilitates the wiring with respect to the production of the required cables and avoids material rejects due to cutting off wiring cables that are too short, but the previously named error sources such as an incorrect connection to incorrect connector points, non-wiring due to forgetting a cable connection, and the like cannot be eliminated.

A test device for switch cabinets or racks is known from DE 10 2008 012 122 B4 that records images of the assembled switch cabinet by means of a camera and identifies installation components with reference to code marks. Operating data such as disturbances, the energy balance, or also service notes are furthermore invoked from a monitoring device and are displayed for the test engineer on a display unit. This system admittedly facilitates the checking and servicing of switch cabinets, but does not help in their assembly.

A test apparatus is furthermore known from DE 10 2011 107 839 A1 that identifies the IT components present in a server rack and their positions in the server rack by means of a camera and by means of an image evaluation device.

Starting from this, it is the underlying object of the present disclosure to provide an assembly method and an auxiliary assembly apparatus of the initially named kind which avoids disadvantages of the prior art and further develops the latter in an advantageous manner. The wiring of the electrical components of a switch cabinet should in particular be facilitated, error sources minimized and a complex and/or expensive rework avoided.

In accordance with the present disclosure, the named object is achieved by the assembly method and auxiliary assembly apparatus described below.

It is therefore proposed to simplify the assembly of such electric switching systems by the use of a monitoring system that automatically identifies the different components respectively provided for connection in the switching system, determines their desired connectors, and automatically checks the actual installation for the correct connector situation. In accordance with the present disclosure, a component respectively provided for connection in the switching system is identified by an identification device, with at least one desired connector point to which the identified component is to be installed is determined by a connector point determination device in dependence on the component identified by the identification device, and with the actual connector point to which the component has actually been connected monitored by a monitoring apparatus and an error message/alarm is output on a deviation of the detected actual connector point from the desired connector point. The various components can be installed in the switch cabinet in a non-predefined or chaotic or alternating order due to such an individual component identification and determination of the desired connectors provided for the respective identified component without the correct build-up of the switch cabinet and the correct connection of the components to one another hereby being mixed up. At the same time, an automated monitoring of the actual connector situations of the components is made possible since, due to the component identification, the monitoring device is aware of where the respective component is to be connected and can, to this extent, reduce the boundary conditions of the data to be processed required for the monitoring.

Various components can also be correctly installed and monitored with respect to their correct installation by the individual component identification, and indeed also in particular components of different types or of different categories or of different assembly such as cables having different cable diameters and/or different conductor types or cord types and/or different connectors. Electronic and power electronic components such as frequency converters, control electronics or capacitors can also be individually identified by the identification device so that the desired connector position can be determined by the connector determination device on the basis of a signal of the identification device and the correction connection can be monitored by the monitoring device.

An augmented reality system can in particular be used here by means of which an image of the switching system is displayed on a display and the connector point which is determined by the determination device for the respective provided component and to which the identified component is to be connected is superimposed into the displayed image on the display. Where the respective next work step is to be carried out is precisely displayed to the workman by the automatic identification of a respective component to be connected and by the display provided by the augmented reality system of the connector point of the respective identified component in the image of the switching system shown on the display. The installation of the switching system is hereby considerably simplified.

Such an augmented reality system is a computer-aided image representation system by means of which an image of the switching system is superimposed with computer-generated additional information.

In an advantageous further development of the present disclosure, the image of the switching system displayed on the display can be a live image or also a recorded image that is provided by a camera directed to the switching system to be assembled. The advantage of the use of a live image that displays the respective current assembly state is a simplified comparison between the actual reality and the reality displayed in the image so that it is ultimately easier for the workman to orient himself. The image can, however, optionally also be buffered or recorded and displayed to the workman with a time offset. Alternatively or additionally to an actual image of the switching system provided from a camera, optionally a digital camera, a computer-generated virtual image of the switching system can optionally also be displayed, with such a virtual image of the switching system being able to be provided, for example, by a three-dimensional CAD system that shows the components and their arrangement.

The image displayed on the display can here be a live image in the manner of a television image constantly currently showing the actual status of the switching system. Alternatively, a freeze frame can also be displayed that is only updated at larger time intervals of, for example, some seconds, that so-to-say freezes the actual status of the switching system, and that facilitates the detailed observation by fewer changes. For example, a freeze frame that is only updated in the rhythm of the work steps, that is updated cyclically, or that is updated after every completed assembly step can also be displayed on the display.

The image of the switching system displayed to the workman is therefore advantageously constantly or cyclically adapted to the progressing assembly status of the switching system. Whereas a relatively "bare" image of the switching system with only a few basic components such as the carrier frame and/or still without components to be installed can be displayed at the start of the assembly of the switching system, as the progress of the assembly moves forward, an ever richer image of the switching system is displayed, and toward the end of the assembly process, an image of the switching system is displayed with more and more components and connections to one another. Said adaptation of the displayed image to the progressing assembly status can be realized in the named manner by displaying a live image or a stored, previously recorded real image. Alternatively or additionally, the image, for example a computer-generated circuit diagram image and/or an image recorded by a camera can be gradually changed in dependence on the identified and assembled components, for example such that, with correctly assembled components, said components are installed into the image to be displayed using computer aid. The image displayed to the workman thus advantageously changes and is adapted to the actual status of the switching cabinet.

Said image of the switching system in which the electric or electronic components and their connector points are superimposed can generally be displayed on different displays. For example, a screen standing next to the switch cabinet or a screen positioned at least in the vicinity of the switching system (e.g., within a viewing range of a workman as the workman assembles the switching system), on which said image is displayed, can be used as the display.

In an advantageous further development of the present disclosure, the image of the switching system can also be displayed on smartglasses that the respective workman can wear during the assembly. Such smartglasses can, for example, comprise a display positionable in the region of a customary eyeglass lens that can, for example, be pivotably supported at the glasses frame to be able to be pivoted in front of the eye or away from the eye. Alternatively or additionally, the display can also work in the manner of a head-up display that can project the image onto the lens through which the workman can look. Such smartglasses are known per se and are described, for example, in documents DE 20 2012 003 317 U1 or DE 20 2012 003 332 U1 to which reference can be made to this extent with respect to the design of the smartglasses.

To be able to display the connector points of the components to be connected and their desired position in the image of the switching system, said augmented reality system or the computer-assisted image generation system can advantageously have a CAD interface to see the connector points of the electrical components to be wired or connected and their desired positions in the electrical switching system from an electrical CAD system to which the augmented reality system can be connected. Such an e-CAD system can, for example, store the circuit diagram of the switching system to be wired or can in particular also be the e-CAD system on which the switching system and/or its circuit diagram was/were generated. Alternatively or additionally to a direct connection to said e-CAD system, a CAD data record that shows the switching system and/or its circuit diagram can also be supplied to the augmented reality system, with such a CAD data record being able to be supplied, for example as a storage medium such as a CD-ROM or a USB stick or in another manner, for which the augmented reality system can have a corresponding interface.

Advantageously, not only the connector point of a component can be displayed or superimposed by means of the augmented reality system or its superimposition apparatus in the image of the switching system displayed on the display, but also its position and/or its alignment and/or its assembly position in the switching system so that a workman can also see exactly where the respective component is to be positioned and assembled in the switching plant. In this respect, the actual position and/or actual alignment of the component and/or the actual position of its connector point can be crossfaded on the display with the corresponding desired position and/or desired alignment that can be acquired from the e-CAD system or can be seen from said e-CAD file to illustrate deviations of the assembled actual position or actual alignment from the desired position or desired alignment.

The identification device for identifying a respective component to be connected can generally be of different designs. For example, the component to be identified can be identified with reference to a mark applied to the component, for example in the form of a barcode and/or of a letter code or numeral code and/or of a different character code and/or of a geometrical shape mark. The identification device can have a barcode reader for this purpose, for example. Alternatively or additionally, however, an identification can also take place in a different manner, for example by means of an RFID chip.

The component to be wired can in particular also be identified by means of an image evaluation device that can identify the component with reference to its contour and/or size and/or color and/or surface property such as light-reflective, mirror-coated, etc. The image evaluation device can in this respect in particular evaluate the image data that are provided by the camera observing the switching system.

Alternatively or additionally, a respective component can also be identified by the identification device with reference to its fitting means such as wire ferrules and/or with reference to the dimensions of its main axes of extent and/or with reference to its diameter and/or its geometry.

It is hereby made possible in a further development of the present disclosure that the workman simply holds a respective component to be assembled in the switch cabinet or in the camera field of the camera observing the switching system or in the scanning zone of a scanning device before the component is actually wired. In the image provided by the camera, the image evaluation device can then identify the component shown there with reference to one of the aforesaid criteria such as a barcode or the like.

In a further development of the present disclosure, a monitoring of individual assembly steps or of all the assembly steps can also be carried out with the aid of the augmented reality system. In this respect, the actual image of the wiring recorded by the camera of the augmented reality system and of the arrangement of the components can be compared with the desired wiring and the desired arrangement of the components such as can be acquired from the e-CAD system. For this purpose, the image evaluation device identifies the individual components in the camera image, for example with reference to the aforesaid barcode, and the leads or the connector parts which are connected thereto and to which the identified component was connected. If the identified connector points and/or wiring courses differ from the desired state in accordance with the circuit diagram such as can be acquired from the e-CAD system or also by a prior teach-in process, an error message can be output and the corresponding error point can be marked on the camera image displayed at the display.

In addition to the complete wiring, part steps of the assembly process can also be monitored by the monitoring device. It can thus, for example, be monitored during the application of a wire ferrule whether a lead having the correct cross-section was insulated and/or was insulated to the correct length and/or whether the wire ferrule was correctly crimped.

Alternatively or additionally, the monitoring device can monitor whether the respective correct tool is used in an assembly step, for example the correct wrench for tightening screws. It can alternatively or additionally be monitored whether a lead was laid in the correct color and/or with the correct cross-section. Alternatively or additionally, the correct fixing of conductor ends can also be monitored.

Alternatively or additionally, the monitoring device can also monitor and recognize incorrect mountings. If, for example, a component is not found or identified at its place specified in accordance with the circuit diagram, an error message can be displayed, for example by imaging an error symbol at the incorrectly mounted position in the camera image.

In a further development of the present disclosure, the assembly or production can be documented by means of said augmented reality system, for example for safety-critical components, in order later to be able to keep a corresponding product function record.

Alternatively or additionally, in a further development of the present disclosure, aids for the workman can also be displayed as required, for example on said display. Such aids can, for example, include texts that appear or can be videos that can be played on the display.

The present disclosure will be explained in more detail in the following with respect to an embodiment and to associated drawings.

DETAILED DESCRIPTION

Figure 1:
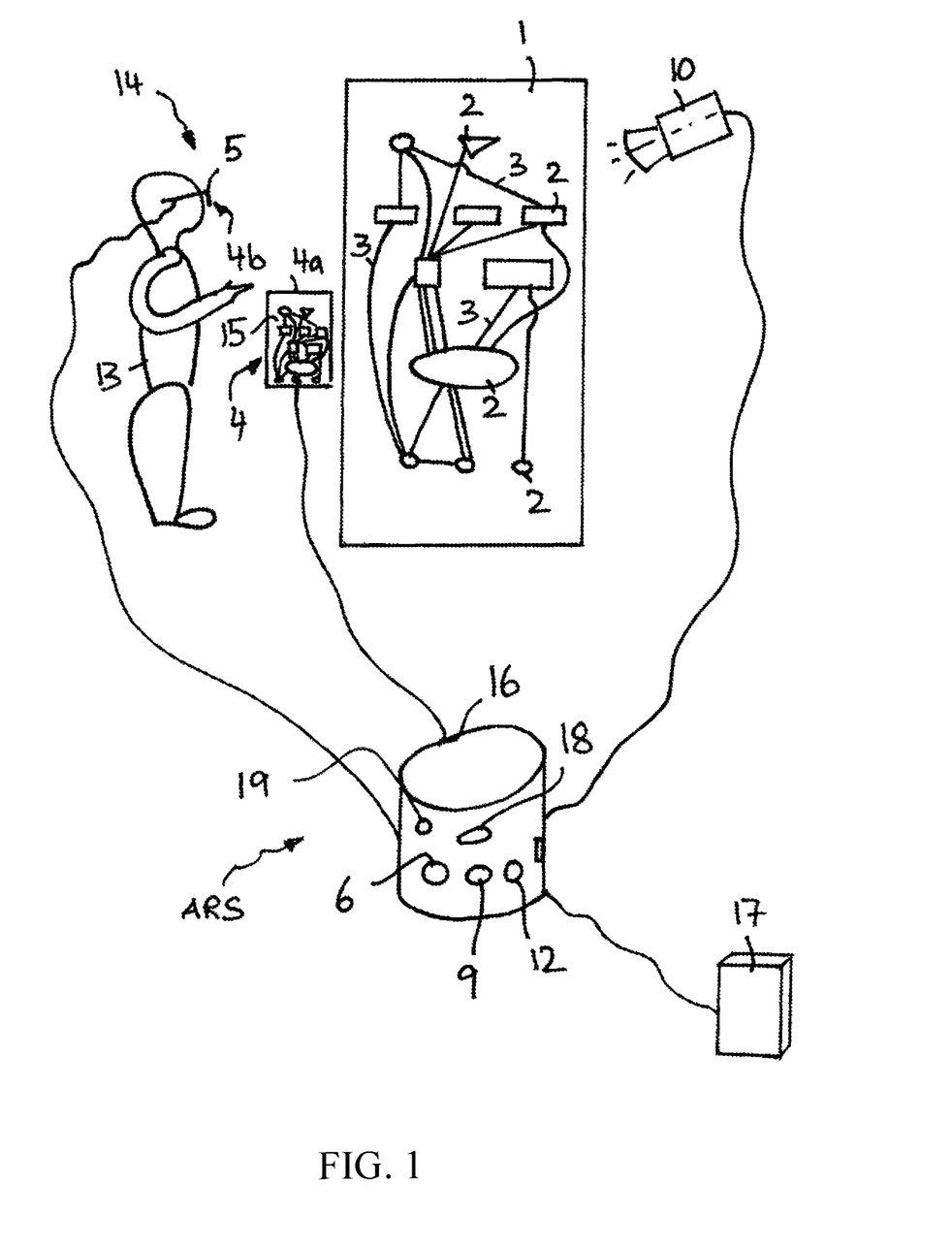
FIG. 1 shows a schematic representation of a switch cabinet to be assembled and the auxiliary assembly apparatus assisting the workman comprising an augmented reality system.

As FIG. 1 shows, the switching system 1 to be assembled can, for example, be a switch cabinet in which various electrical or electronic components 2, for example in the form of power electronic components such as frequency converters and technical control components such as signal generators, circuit blocks and the like are to be assembled and to be wired to one another by cables 3. The electrical components 2 can here each comprise at least one connector point or also a plurality of connector points 7 to which the electrical components are to be wired. Instead of the cables 3 shown, the wiring can also take place by connection to circuit boards, assembly boards and the like in which corresponding wiring leads can be integrated.

To simplify the assembly for the workman 13, the auxiliary assembly apparatus 14 comprises an augmented reality system ARS that displays an image 15 of the switching system 1 to the workman 13 and superimposes therein computer-assisted information in the form of symbols, marks, characters, videos, and the like that can include assembly instructions and/or information helpful for the assembly. Alternatively or additionally, the computer-assisted information can identify connector points, display desired positions, and/or display design alignments of the electrical components.

As FIG. 1 shows, the ARS can comprise at least one camera 10, a server or controller 16 (referred to herein as controller 16 for the sake of brevity), and at least one display 4.

Each camera 10 is directed toward the switching system to be assembled, and configured to observe the switching system 1 and provide an actual image of the switching system 1. Further, each camera 10 is communicably coupled with controller 16.

Each display 4 is communicably coupled with controller 16. Camera images received at controller 16 from camera 10 are transmitted from controller 16 to display 4 for display thereon. In one example, the ARS includes a display 4 in the form of a screen 4a installed next to the switching system 1, which is viewable by a workman facing the switching system. Screen 4a may optionally be mechanically coupled to switching system 1 (e.g., in direct physical contact with and fastened to switching system 1).

Figure 2:
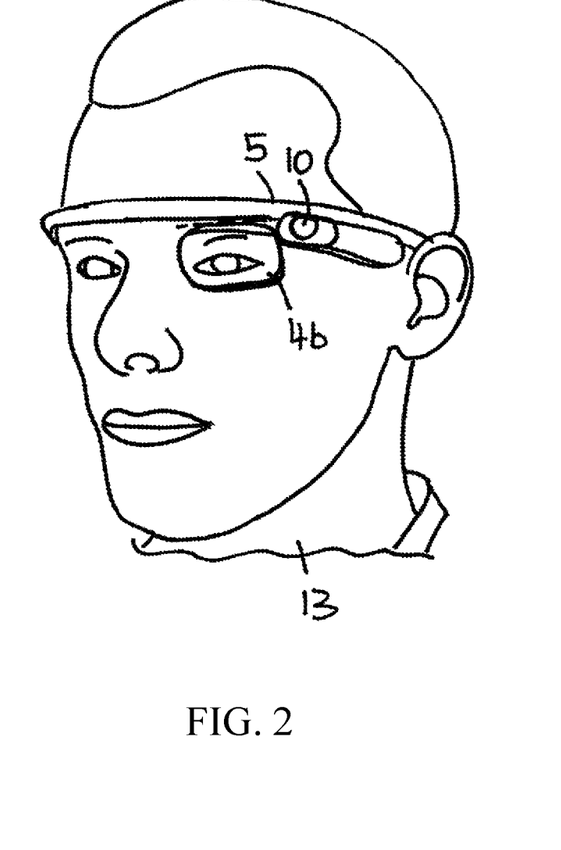
FIG. 2 shows a schematic representation of smartglasses with an integrated display on which the augmented reality system of FIG. 1 can display a camera image and assembly aids superimposed therein to the workman.

Alternatively or additionally, the ARS may include a display 4 in the form of an eyeglass display 4b integrated in smartglasses 5, cf. FIG. 2, said eyeglass display being configured to display, for example in the manner of a projector or of a head-up display, the images to be presented and information on an eyeglass lens or on an eyeglass-lens like screen surface that can be positioned in front of an eye of the workman 13, and can, for example, also be pivotable away from the eye of the workman to allow the workman a free view of the work to be carried out.

In the example shown in FIG. 1, the ARS includes a camera 10 which is not integrated in smartglasses 5. Alternatively or additionally, as FIG. 2 shows, a camera 10 can be integrated into said smartglasses 5 as part of the ARS. In either case, controller 16 may be configured to transmit the images captured by the camera (e.g., live images or stored, previously recorded real images) along with additional information to be superimposed on it to one of the displays 4a or 4b, such that the image with the additional information overlaid on it may be displayed.

Controller 16 receives signals from and sends signals to the various components of the ARS. Further, controller 16 includes a processor configured to execute instructions stored in non-transitory memory of controller 16. Sets of the instructions form various functional modules of controller 16. These functional modules, which are described further below, include an identification device 6, an image evaluation device 9, a monitoring device 18, and a connector position determination device 19.

Further, as FIG. 1 shows, the processor 16 of the ARS can be connected to an electronic computer-aided design (e-CAD) system 17 from which information can be acquired on the components 2 to be wired, their connector points, their desired positions, their desired alignments in the switching system 1, their circuit diagrams, and/or their wiring plans. In one example, the e-CAD system comprises a software program for designing electronic systems such as switching system 1, and non-transitory memory storing the information along with instructions executable by a processor to transmit the information to controller 16.

For this purpose, the ARS or the auxiliary assembly system can first identify a component 2 to be installed in the switching system 1 by means of identification device 6. In this respect, image evaluation device 9 and/or a scanning device or a different reading device can be provided that can evaluate a mark 8 at the component 2, for example in the form of a barcode. If such a barcode or such a mark 8 is recognized in the image data provided by the camera 10, the component 2 can be identified, for example accessing the e-CAD system 17 in which corresponding information associated with the recognized barcode can be stored. Alternatively or additionally to such a recognition with reference to a barcode or to a mark, the identification device 6 is also configured to identify a component 2 with reference to its shape and/or contour and/or color or other characteristics, e.g. by recognizing the shape and/or contour and/or color or other characteristics in an image captured by the camera.

A cable to be connected can, for example, be recognized by the identification device by means of said image evaluation device 9 with reference to the cable diameter and/or the cable jacket color and/or the cable jacket pattern and/or the cable length and/or the cable end pieces and/or the cable connector pieces and/or a cable mark. Special marks such as bar codes or numerical sequences can optionally also be dispensed with and the cable can be recognized with reference to the other named criteria so that no special individual cable marks have to be applied in the assembly. Other components of the switch cabinet such as its power electronic components such as frequency converters or signal generators and circuit blocks can be identified by the image evaluation device 9, for example with reference to the dimensions of the main axes of extent and/or the outline contour and/or the color and/or the surface structure and/or the surface pattern thereof.

Once the respective component provided for connection has been identified, its connector points and/or positioning in the switch cabinet can be determined. for example, connector position determination device 19 includes instructions stored in non-transitory memory which are executable by the processor to determine said connector points in dependence on a signal from the identification device 6 that identifies the component 2, for example by accessing said e-CAD system 17 in which the wiring of the switch cabinet or the connector points of the components 2 can be stored. Thus, an indication of the correct cable for a given connector point, for a desired configuration of the components within the switch cabinet, may be obtained by the connector position determining device by accessing e-CAD system 17.

Figure 3:
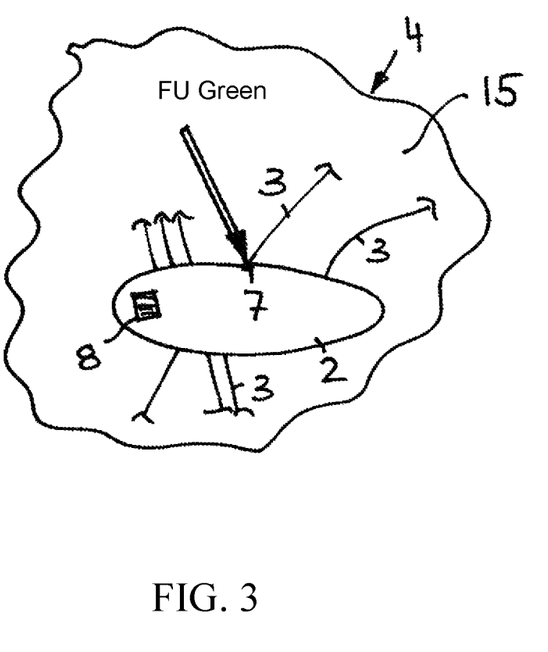
FIG. 3 shows a schematic, sectional representation of the camera image of a component to be wired with an auxiliary assembly arrow superimposed therein that identifies the connector point currently to be assembled.

As FIG. 3 shows, additional instructions can be superimposed on the image of a component 2 displayed on the display 4 that, for example, indicates a connector point 7; in the example shown, the connector point 7 for a green wire 3 that should lead to a frequency converter is illustrated by the arrow symbol and the associated superimposed short symbol "FU Green".

Each assembly step can be shown sequentially on the display 4 in this manner, with a check also being able to be made after a completed assembly step as to whether a correct cable—for example with a correct diameter and/or correct color and/or correct cable type—has been connected to the correct connector point.

For this purpose, monitoring device 18 includes a comparison device having instructions stored in non-transitory memory which are executable by the processor to compare a camera image recorded after the assembly step and the actual information acquired from the camera image on the actual status of the switch cabinet assembly process with the desired information acquired from the e-CAD system 17 (e.g., indicating a desired configuration of the switch cabinet). In the event of deviations that exceed a specific threshold value, for example with respect to position of components and/or connectors, or that differ from other digital reference data in the form of desired characteristics, monitoring device 18 is includes further instructions executable by the processor to output an error message, which in turn is transmitted by the controller to display 4 to be displayed to the workman 13 on the display 4. Said monitoring device 18 can further include instructions (e.g., as part of the comparison device) to compare the actual connector points of a component 2 with its desired connector points that were determined by the connector position determination apparatus 19 on the basis of a signal of the identification device 6, along with instructions to output an error message to the display, as required, when the actual connector points do not match the desired connector points.

Said automated individual component recognition by the identification device 6 in interaction with the automated determination of the connector points by the connector position determination device 19 and with the monitoring device 18 allows the workman also to take off the smartglasses 5 at times and to carry out the assembly without augmented reality, and without the cabling of the switch cabinet hereby being able to be mixed up. Taking off the smartglasses 5 allows a more pleasant working that is more free of fatigue; a correctly carried out assembly is, however, simultaneously ensured.

The invention claimed is:

1. A method of assembling an electrical switching system, comprising:
for an initial assembly of the electrical switching system, the initial assembly includes gradually setting up a plurality of different electrical components in a non-fixed and/or alternating order,
identifying a component of the plurality of different electrical components respectively provided for connection in the electrical switching system via an identification device, wherein the plurality of different electrical components is wired and/or connected to one another, and wherein the plurality of different electrical components includes cables and one or more of frequency converters, control electronics, and capacitors;
determining at least one desired connector point to which the identified component is to be connected via a connector point determination device in dependence on the component identified by the identification device;
displaying an image of the electrical switching system that is recorded by a camera on a display, wherein the image of the electrical switching system is a live image or a cyclically updated freeze frame of the electrical switching system;
displaying an indicator of the at least one desired connector point to which the identified component is to be connected on the display, the indicator superimposed onto the image of the electrical switching system;
monitoring an actual connector point to which the identified component is connected based on the image of the electrical switching system and comparing the actual connector point to the at least one desired connector point via a monitoring device; and
outputting an error message on the display responsive to a deviation of the actual connector point from the at least one desired connector point.

2. The method in accordance with claim 1, wherein the image of the electrical switching system is displayed on the display by an augmented reality system (ARS) and the at least one desired connector point to which the identified component is to be connected and which is respectively determined by the connector point determination device for the provided component is superimposed in the displayed image on the display.

3. The method in accordance with claim 2, wherein a desired assembly position and/or a desired position of the identified component in the electrical switching system is also superimposed in the displayed image on the display by the ARS.

4. The method in accordance with claim 3, wherein the image of the electrical switching system displayed on the display is continuously or cyclically adapted to an actual assembly status of the electrical switching system, wherein, as the assembly progresses, more components and connections of the more components to one another are gradually displayed in the image of the electrical switching system, with the adaptation of the displayed image being controlled in dependence on the components identified by the identification device and/or in dependence on connection procedures monitored by the monitoring device.

5. The method in accordance with claim 1, wherein the at least one desired connector point and a desired position in the electrical switching system to be determined for the identified component is taken by the connector point determination device from an electrical computer aided drawing (CAD) system and/or from a CAD data record that shows the electrical switching system and/or a circuit diagram of the electrical switching system.

6. The method in accordance with claim 1, wherein the respective component provided for connection is identified by the identification device with reference to a mark applied to the component, in particular in the form of a barcode or a character code.

7. The method in accordance with claim 1, wherein the respective component provided for connection is identified by the identification device through an image evaluation device with reference to image data that is also used to produce the image of the electrical switching system on the display.

8. The method in accordance with claim 1, wherein the respective component provided for connection is identified by the identification device with reference to a color of the component and/or to a diameter of the component and/or to a dimension of at least one main axis of extent and/or to a geometrical measure of the component.

9. The method in accordance with claim 2, wherein the image of the electrical switching system displayed on the display is provided by the camera directed to the electrical switching system as a live image or as a recorded image.

10. The method in accordance with claim 2, wherein the image of the electrical switching system is displayed on smart glasses to be worn by a workman.

11. The method in accordance with claim 10, wherein the image of the electrical switching system to be displayed on the display is recorded by the camera provided at the smart glasses.

12. The method in accordance with claim 1, wherein at least one image of the electrical switching system provided during and/or after an assembly step is evaluated by the monitoring device by an image evaluation device, with a component identified by the image evaluation device being compared with respect to an actual position of the component and/or an actual alignment of the component and/or an actual wiring acquired by the component from the image with a desired position and/or a desired alignment and/or a desired wiring provided by the connector point determination device for the identified component, with an error message being output on a deviation in said desired/actual comparison.

13. The method in accordance with claim 12, wherein at least one of the following monitoring steps is carried out by the monitoring device:
on attachment of a wire ferrule, monitoring whether a lead having a correct cross-section was insulated and/or insulated to a correct length and/or whether the wire ferrule was correctly crimped;
monitoring use of a predefined tool;
monitoring laying of the lead in a predefined color and/or having a predefined cross-section;
monitoring fitting of conductor ends in a predefined manner;
monitoring incorrect mountings; and
monitoring the assembly of a component at a predefined position of the electrical switching system.

14. The method in accordance with claim 1, wherein a switch cabinet is assembled as the electrical switching system in which various electronic and power electronic components such as frequency converters, capacitors, and signal generator modules, on the one hand, and cables having different cable diameters, on the other hand, are installed.

15. An auxiliary assembly apparatus for facilitating and/or checking a correct assembly of an electrical switching system that is gradually built up from a plurality of different electrical components in a non-fixed order, comprising:
an identification device for identifying an electrical component of the plurality of different electrical components provided for connection in the electrical switching system for an initial assembly of the electrical switching system, wherein the plurality of different electrical components includes cables and one or more of frequency converters, control electronics, and capacitors;
a connector point determination device for determining at least one desired connector point to which the identified component is to be connected in dependence on a signal of the identification device;
a display that displays an image of the electrical switching system and an indicator of the at least one desired connector point superimposed onto the image of the electrical switching system, wherein the image of the electrical switching system is a live image or a cyclically updated freeze frame of the electrical switching system captured by a camera; and
a monitoring apparatus for monitoring an actual connector point to which the identified component is connected based on the image of the electrical switching system, comparing the actual connector point to the at least one desired connector point, and providing an error message on the display responsive to a deviation of the actual connector point from the at least one desired connector point.

16. The auxiliary assembly apparatus in accordance with claim 15, having an augmented reality system (ARS) comprising the display for displaying the image of the electrical switching system and a superimposition device for superimposing the at least one connector point of the identified component in the image of the electrical switching system displayed on the display.

17. The auxiliary assembly apparatus in accordance claim 16, wherein the camera directed to the electrical switching system is provided for providing the image to be displayed on the display as the live image and/or as a recorded image.

18. The auxiliary assembly apparatus in accordance with claim 17, wherein the display and/or the camera are integrated in smart glasses to be worn by a workman.

19. The auxiliary assembly apparatus in accordance with claim 16, wherein the ARS has a computer aided drawing (CAD) data interface and is connectable to an electrical CAD system in which the electrical switching system and/or a circuit diagram of the electrical switching system can be generated and/or stored.

20. The auxiliary assembly apparatus in accordance with claim 15, wherein the identification device has a code reader for reading a mark applied to a component to be assembled, in particular a barcode reader.

21. The auxiliary assembly apparatus in accordance with claim 15, wherein the identification device has an image evaluation device for evaluating image data displayed on the display and identifying a component from the image data.

22. The auxiliary assembly apparatus in accordance with claim 15, wherein the monitoring device has an image evaluation device for evaluating at least one image recorded during and/or after an assembly step and has a comparison device for comparing information acquired by the image evaluation device relating to an actual position and/or to an actual alignment and/or to an actual wiring of the identified component with a desired position and/or a desired alignment and/or a desired wiring.

23. The auxiliary assembly apparatus in accordance with claim 22, wherein an error alarm is provided for superimposing an error message in the image shown on the display in dependence on a signal of the comparison device.

24. A method of assembling an electrical switching system, comprising:

for an initial assembly of the electrical switching system, wherein the initial assembly includes gradually setting up a plurality of different electrical components in a non-fixed and/or alternating order, identifying a component of the plurality of different electrical components respectively provided for connection in the electrical switching system via an identification device, the identification device identifying the component based on at least one of a contour, a size, a color, and a surface pattern of the component in a picture of the component, wherein the plurality of different electrical components is wired and/or connected to one another, wherein the plurality of different electrical components includes cables and one or more of frequency converters, control electronics, and capacitors;

determining at least one desired connector point to which the identified component is to be connected via a connector point determination device in dependence on the component identified by the identification device;

displaying an image of the electrical switching system that is recorded by a camera on a display, wherein the image of the electrical switching system is a live image or a cyclically updated freeze frame of the electrical switching system;

displaying an indicator of the at least one desired connector point to which the identified component is to be connected on the display, the indicator superimposed onto the image of the electrical switching system;

monitoring an actual connector point to which the identified component is connected based on the image of the electrical switching system and comparing the actual connector point to the at least one desired connector point via a monitoring device; and outputting an error message on the display responsive to a deviation of the actual connector point from the at least one desired connector point.

* * * * *